Sept. 6, 1966  F. T. OGLE ET AL  3,271,472
METHOD OF CONTROLLING A THERMAL CONVERSION PROCESS
Filed Sept. 22, 1961
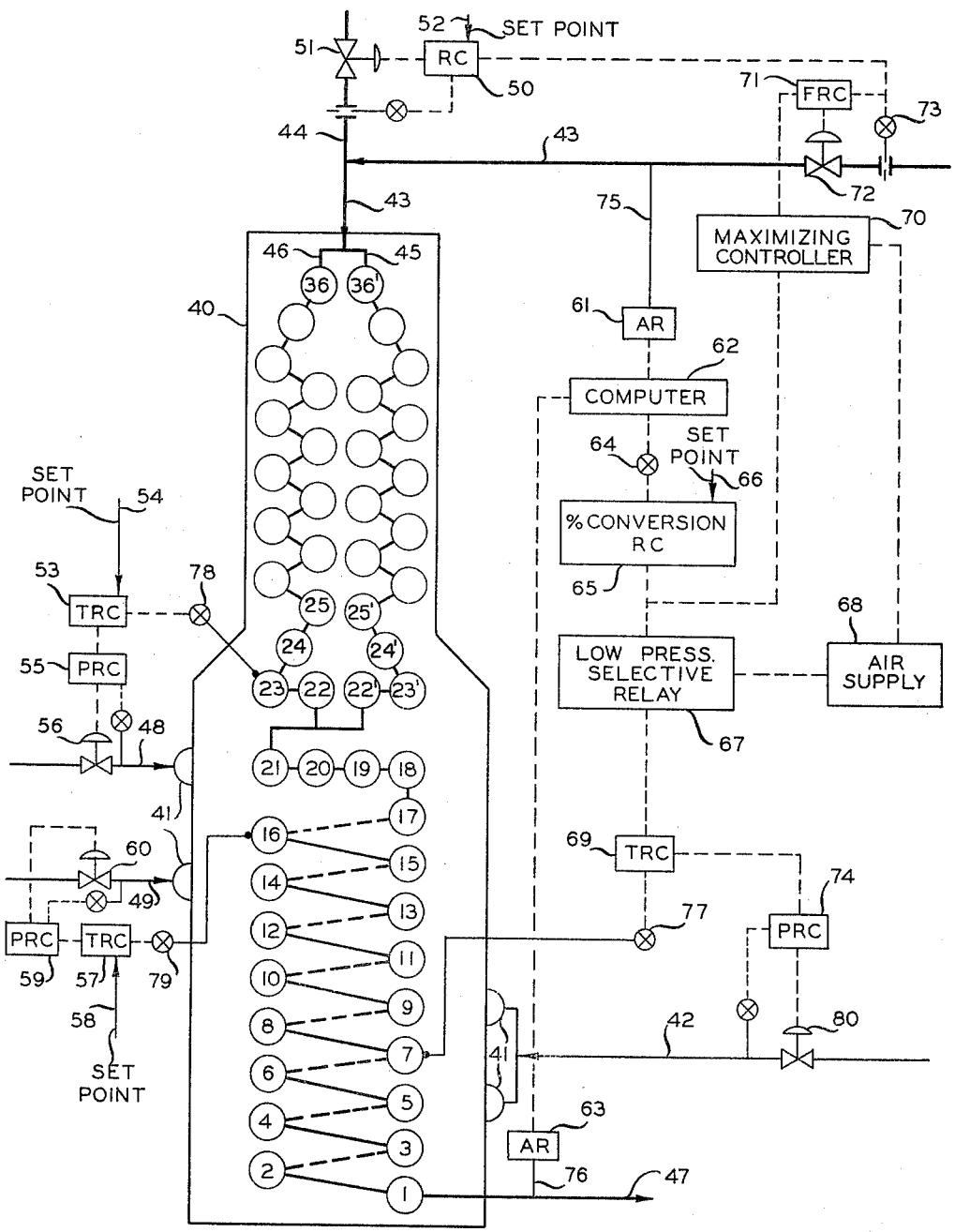
INVENTORS
F. T. OGLE
D. E. BERGER
BY Hudson & Young
ATTORNEYS United States Patent Office 3,271,472
Patented Sept. 6, 1966

3,271,472
METHOD OF CONTROLLING A THERMAL CONVERSION PROCESS
Frank T. Ogle and Donald E. Berger, both of Bartlesville, Okla., assignors to Phillips Petroleum Company, a corporation of Delaware
Filed Sept. 22, 1961, Ser. No. 140,039
6 Claims. (Cl. 260—683)

This invention relates to an improved method of and apparatus for controlling a process. In one specific aspect, this invention relates to an improved method of and apparatus for manipulating two input process variables in response to a measured and controlled determination, one of said manipulated process variables having a restricted operating range.

It is conventional to manipulate one or more process variables in response to a process measurement. For example, the overhead product of a fractionator can be analyzed and the reboiler heat input rate and/or rate of reflux flow to the fractionator adjusted independently in response to said analysis. Assuming that the rate of flow of reflux to the fractionation zone con undergo only partial adjustment toward the desired level, it would then be desirable to be able to automatically adjust the reboiler heat input rate in response to said overhead product analysis and to further adjust the reboiler heat input rate responsive to the partially adjusted reflux rate of flow.

Another example, wherein it is desirable to manipulate at least two input process variables in response to the measurement of a process condition (controlled variable), is in the production of ethylene from ethane, propane, n-butane and mixtures of these light hydrocarbons by thermally cracking the hydrocarbon feed in a furnace. Maximum furnace throughput is normally preferred with the furnace operating to produce a desired constant level of conversion of feed to cracked product whereby the composition of the cracked product is substantially constant. The ultimate capacity of a thermal cracking furnace is generally limited by the maximum allowable tube coil external skin temperatures. The conversion of the hydrocarbon feed to ethylene thus is a function of the hydrocarbon feed rate and cracking temperature which, at a fixed heat flux through the cracking tube, requires a certain external tube skin temperature. It is desirable that a control method be employed which will permit the furnace to operate at a maximum throughput and at a desired conversion level without exceeding safe temperature limits on the tube coil.

Accordingly, an object of this invention is to provide an improved method of and apparatus for controlling a process.

Another object of this invention is to provide an improved method of and apparatus for manipulating at least two process variables in response to a process measurement or determination.

Another object of this invention is to provide an improved method of and apparatus for controlling the operation of a thermal cracking furnace.

Other objects, advantages, and features of our invention will be readily apparent to those skilled in the art from the following description and the appended claims.

The inventive control method is better understood by referring to the method of controlling a specific process. Hereinafter, the inventive control method and apparatus therefor will be discussed as applied to the thermal cracking of a light hydrocarbon feed stream (e.g., butane, propane or ethane or mixtures thereof) to produce ethylene and other by-products. It is within the scope of this invention to apply the inventive control method to other processes.

The inventive method of control as applied to the thermal cracking of a light hydrocarbon feed stream comprises determining the percent conversion (destruction) of the light hydrocarbon feed stream to cracked product in a thermal cracking furnace. The rate of hydrocarbon feed to said thermal cracking furnace is automatically adjusted, or manipulated, in response to said computed percent conversion, and the flow of heat to said furnace is automatically manipulated in response to the measured tube skin temperature and in response to said determined percent conversion so as to enforce maximum hydrocarbon throughput at the desired conversion level while operating at but not exceeding safe temperature limits on the tube coil.

An overall arrangement of apparatus capable of thermally cracking and otherwise treating materials is disclosed in U.S. Patent 2,876,865 to J. R. Cobb, issued March 10, 1959. Accordingly, a light hydrocarbon feed stream (e.g., butane, propane, or ethane) is directed into a cracking furnace where it is subjected to sufficient heat to crack the constituents of the feed stream to certain desired products (e.g., ethylene) and to other byproducts. The type of furnace employed is described in U.S. Patent 2,638,879, issued on May 19, 1953, to F. O. Hess and commonly referred to as the "Selas Furnace." Such furnaces comprise a heating chamber with burners mounted in the walls thereof to direct heat toward a serpentine tube (or tubes) having a plurality of series-connected horizontal sections. The feed flows through the tube. Such thermal cracking processes are affected by numerous process variables, and in order to obtain an optimum control, a very large number of these variables need be considered. Examples of some of the variables that must be considered are: feed composition, maximum temperatures that can be permitted by the materials of construction of the furnace, maximum tube skin temperatures allowed by the various segments of the cracking tube coil, depth of the cracking (percent conversion and selectivity of reaction to the formation of desired products) which leads to maximum production, the pressure drop through the furnace, the actual composition of the cracked gas effluent, rates of feed of the hydrocarbon cracking stock, fuel gas feed rate, and the proportion of steam that is mixed with the hydrocarbon feed.

According to one embodiment of our invention, a thermal cracking process is controlled by calculating the percent conversion of a light hydrocarbon feed stream in a thermal cracking furnace by a conventional automatic computing technique, from analytical measurements of the feed and product stream composition made by conventionally known analyzing apparatus. This calculated percent conversion, a measured tube skin temperature and a desired maximum value of this tube skin temperature are correlated by conventional control apparatus in a novel configuration to provide control signals to suitably manipulate the light hydrocarbon feed rate to the furnace and the rate of flow of fuel gas to the burners in the radiant section of the furnace wherein the tube coil characterized by the tube skin temperature limit is located.

Assuming that the light hydrocarbon feed to the thermal cracking furnace is comprised substantially of propane, the percent conversion of the propane can be calculated from the following equation:

$$\text{Mol Percent Conversion} = 100 \frac{\text{mol percent } C_3H_8 \text{ in feed} - \text{mol percent } C_3H_8 \text{ in product} \times K}{\text{mol percent } C_3H_8 \text{ in feed}}$$

where K is the expansion factor. K can be expressed as:

$$\frac{\text{Mols of furnace effluent}}{\text{Mols of furnace feed}}$$

and is, therefore, a function of the conversion level and specificity of reaction to the desired product, ethylene. As previously noted, the object of the inventive control system when applied to the specific embodiment of producing ethylene is to regulate conversion to a fixed or desired value and furnace throughput to a maximum value. Therefore, the dependence of the K value for propane upon the conversion can be ignored as the effect of small convertion variations centered around the control point produces only small variation in the K value. This in turn causes only slight errors in the percent conversion as calculated by the above equation. K values for thermal cracking furnace feedstocks of the following compositions at specified desired conversion levels are presented as illustrative:

| Feed Stock | Feed Stock Purity (percent) | Desired Conversion | K Value |
| --- | --- | --- | --- |
| Ethane | 93 | 50 | 1.50 |
| Ethane | 93 | 60 | 1.60 |
| Ethane | 93 | 75 | 1.78 |
| Propane | 99 | 92 | 1.85 |
| n-Butane | 99 | 96 | 1.95 |

The drawing is a schematic representation of one embodiment of the inventive control method and apparatus therefor.

Referring now to the drawing, there is shown a furnace 40 of the type described in U.S. Patent 2,638,879. Disposed within the furnace is a plurality of serpentine series-connected tubes numbered respectively 1 through 36 and 22' through 36'. In the embodiment illustrated, tubes 1–21 are exposed to radiant heating from banks of radiant burners 41, only a portion of which are herein illustrated, each of which banks include burners on both sides of the furnace receiving fuel such as natural gas through their respective conduits 42, 48 and 49.

A light hydrocarbon feed is directed through a conduit 43, mixed with an appropriate quantity of steam that enters conduit 43 via conduit 44, and the mixture is then divided into two equal portions, preferably, and directed through conduits 45 and 46 into the preheating section of the furnace. The preheating section extends from tubes 36 and 36' down to and including tubes 22 and 22' respectively. In this section of the furnace substantially no cracking takes place but the feed mixture is heated to an appropriate temperature level so that when the two portions join together upstream of tube 21 the hydrocarbon feed will be at a temperature to begin cracking under the influence of the heat applied to tube 21, the cracking continuing in tubes 20–1. For the purpose of explanation hereinafter, it is assumed that propane is the major component in the hydrocarbon feed flowing through conduit 43.

The hydrocarbon feed stream passes from the convection section to the shock section which comprises tubes 18, 19, 20 and 21 and finally passes through the radiant cracking section that extends from tube 17 down to tube 1. The shock section is so called because it is here that the feed first begins to crack and composition changes occur. Heat flux is very high due to a relatively cold gas and high radiant temperatures. Heating in the shock section is primarily by radiant heating as it is in the radiant section that follows. The character of the composition changes in the propane feedstock as it flows through the tubes is conventional and well known in the art. Cracked gas effluent is withdrawn from the radiant section by means of a conduit 47.

The furnace tubes are made of different materials according to the temperature levels to which they are subjected while in service. For example, in one embodiment, tubes 36–25 and 36'–25' are constructed of carbon steel having a maximum allowable tube exterior skin temperature of about 870° F. The succeeding tubes 24–22 and 24'–22' are constructed of 2¼ percent chromium steel having a maximum allowable exterior skin temperature of about 1075° F. The tubes extending from 21–1 are constructed of type 302B stainless steel having a maximum allowable tube exterior skin temperature of about 1650° F.

Therefore, it can be seen that tube construction prescribes a step-type maximum temperature gradient curve for the furnace. This curve is referred to as the "maximum allowable tube skin temperature," which occurs on the outside of the tube. This outside tube temperature will hereinafter be referred to as the "skin temperature." For optimum operation, it is desired to operate the furnace as close to the maximum allowable tube skin temperature as possible without exceeding it.

The rate of flow of stream from conduit 44 to conduit 43 is controlled by a conventional flow-ratio-controller 50 opening or closing valve 51 in response to the flow of the hydrocarbon feed through conduit 43. Flow-ratio-controller 50 has a set point 52 representative of the desired steam to hydrocarbon feed ratio.

The skin temperature of tube 23 is determined by a thermocouple such as a Chromel-Alumel thermocouple having a ceramic-metal sheathing. A signal representative of this temperature measurement is transmitted by E.M.F.-to-pneumatic transducer 78 to a conventional temperature-recorder-controller 53 having a set point 54 representative of the maximum allowable skin temperature of tube 23. A signal is transmitted in a conventional cascade system from temperature-recorder-controller 53 to a pressure-recorder-controller 55 which opens or closes valve 56 in response to the skin temperature of tube 23, thereby controlling the rate of flow of fuel gas through conduit 48.

The skin temperature of tube 16 is measured as in the case of tube 23 and a signal representative of said temperature measurement is transmitted by E.M.F.-to-pneumatic transmitter 79 to temperature-recorder-controller 57 having a set point 58 representative of the maximum allowable skin temperature of tube 16. Temperature-recorder-controller 57 transmits a cascade signal to pressure-recorder-controller 59 which in turn opens or closes valve 60 in response to skin temperature measurement of tube 16, thereby controlling the rate of flow of fuel gas through conduit 49.

The hydrocarbon feed flowing through conduit 43 is sampled via conduit 75 and analyzed by a conventional analyzer 61 such as a chromatographic analyzer, which includes a recorder-transmitter. Instrumentation of this type is manufactured by Perkin-Elmer Corporation and others. When employing a chromatographic analyzer-recorder-transmitter, a peak reading and holding device such as described in ISA Journal 9, page 28, October 1958, will transmit the analog of the concentration of the component of interest, in this case propane, in sample stream 75 to an analog computer 62. In the same manner, an analyzer-recorder transmitter 63 can be utilized to analyze the product stream flowing through conduit 47 via sample conduit 76 and the result thereof transmitted as in the case of analyzer-recorder 61 to computer 62. Although two analyzers have been herein illustrated, it is within the scope of this invention to employ only one analyzer-recorder-transmitter and to alternately pass samples of the feed and product stream to said analyzer-recorder, transmitting the analyzes to analog computer 62 alternately following each analysis.

When employing a chromatographic analyzer to analyze the feed and product streams, the output of the peak reader is an electrical signal in the range of 0–50 volts D.C. Computer 62 can, therefore, be a conventional small analog computer capable of solving the equation for the percent conversion previously noted in response to input signals from analyzer-recorders 61 and 63, said input signals in the range of 0–50 volts D.C. An analog computer capable of performing this operation is Model TR–10 manufactured by Electronic Associates, Long Branch, New Jersey.

Computer 62 transmits an electrical output signal representative of the percent conversion of propane to an E.M.F.-to-pneumatic transducer 64 such as the Minneapolis-Honeywell 1–BA–20. Transducer 64 transmits an air signal in the range of 3–15 p.s.i., which is representative of the percent conversion, to a conversion-recorder-controller 65 such as a Foxboro Model 5412 recorder-58P4 controller. Recorder-controller 65 has a set point 66 representative of the desired percent conversion for the particular feedback flowing through conduit 43.

Recorder-controller 65 transmits a signal representative of the desired skin temperature for tube 7 required to produce the desired percent conversion to a low pressure selective relay 67. A pneumatic pressure representative of the maximum allowable skin temperature of tube 7 is transmitted from an air supply 68 to low pressure selective relay 67. Low pressure selective relay 67 is a conventional instrument capable of selecting and transmitting from said instrument the lower of two air pressure signals received by said instrument. A suitable low pressure selective relay is the Taylor Low Pressure Selector Relay, Model SK1359.

The air pressure signal received from air supply 68 is compared with the input signal received from recorder-controller 65 and the lower pneumatic signal representing the lower of the two temperatures is allowed to pass through low pressure selective relay 67 as the set point to conventional temperature-recorder-controller 69. The signal received by temperature-recorder controller 69 from low pressure selective relay 67 operates in cooperation with the measurement of the actual temperature of tube 7 from transmitter 77 to continuously adjust the set point of pressure-recorder-controller 74 which in turn manipulates valve 80 such that, after the transient behaviors of the interconnected control systems have damped out, the measurements and the set points received by the individual controllers are equal.

Recorder-controller 65 also transmits its output signal as the measurement input to a conventional controller 70 such as the Foxboro M/58P4 controller-M/5412PS recorder which here performs a maximizing function. The air pressure signal representative of the maximum allowable skin temperature of tube 7 is also passed from air supply source 68 to maximizing controller 70 where it is introduced as said controller's set point. Maximizing controller 70 compares the two input signals, performs the usual controller functions and transmits a signal as the set point to a conventional flow-recorder-controller 71. Flow-recorder-controller 71 opens or closes valve 72 in response to the signals transmitted from maximizing controller 70 and from flow transmitter 73. Thus, maximizing controller 70 operates so as to adjust the hydrocarbon feed rate through conduit 43 to (1) increase the hydrocarbon feed rate to the furnace if the demand signal transmitted from conversion-recorder-controller 65 represents a tube skin temperature below the maximum allowable represented by air pressure source 68, thereby demanding a greater heat input rate to crack the increased feed rate to the desired conversion level which forces the furnace to rise toward and achieve the maximum allowable tube 7 skin temperature; or (2) reduce the hydrocarbon feed flow rate through conduit 43 to obtain the desired percent conversion while operating at the maximum allowable tube 7 skin temperature. Set points from 65 and 68 through 67 to 69 cause tube 7 temperature to always run at the maximum (1650° F.) or below. If below, then 70 raises feed rate which lowers conversion which increases 65 output signal progressively until 65 signal equals 68 signal at which time 70 maintains this feed flow which causes the tube 7 skin temperature demand signal (from 65) to equal the predetermined maximum.

Temperature-recorder-controller 69 is a conventional instrument such as a Foxboro 5412 PS, M/58P4 recorder-controller. The skin temperature of tube 7 is determined in the same manner as was employed to measure the skin temperature of tube 23. A signal representative of the temperature measurement is transmitted by transmitter 77 to temperature-recorder-controller 69. This signal is compared with the set point signal received from low pressure selective relay 67 and a signal transmitted to a conventional pressure-recorder-controller 74 in response thereto. Pressure-recorder-controller 74 thus adjusts the flow of gaseous fuel through conduit 42 in response to the pressure in conduit 42 and the percent conversion of the light hydrocarbon furnace feed.

In the operation of a clean thermal cracking furnace, it has generally been found necessary to operate the furnace below the maximum allowable skin temperature in order to obtain a desired percent conversion of the light hydrocarbon feed. As carbon or coke begins to build up in the furnace tubes through continuous operation, it is necessary to raise the tube skin temperature in order to maintain the desired percent conversion level. The inventive control system is particularly adapted to this situation. The control system permits a gradual increase of the tube skin temperature while at the same time maintaining maximum hydrocarbon throughput, raising the tube skin temperature so as to maintain the desired percent conversion until the maximum allowable tube skin temperature is reached. As a result of having set the percent conversion level and having reached the maximum allowable tube skin temperature, the maximum hydrocarbon throughput is established. As further carbon buildup occurs, the tube skin temperature being at the allowable maximum, the inventive control system then reduces the hydrocarbon feed rate progressively so as to maintain the desired conversion without exceeding the skin temperature limit, thus keeping furnace cracking capacity at the maximum permitted by carbon deposition. At such time as the hydrocarbon feed rate is so low that processing economic dictate removal of the furnace from cracking operation, it is regenerated by removal of coke deposits by air and steam.

Although the inventive control method has been described as particularly applied to the control of a light hydrocarbon thermal cracking process, it is within the scope of this invention to apply the control method of other processes wherein it is desired to manipulate two or more process variables in response to a process determination so as to produce a desired result. For example, in controlling a fractionator, a signal representative of the concentration of a constituent in the overhead product stream can be passed to a controller having a set point representative of the desired concentration level. A signal representative of a required flux flow rate is passed from said controller to a low pressure selective relay, said low pressure selective relay comparing said signal with a signal transmitted to said relay representative of the maximum allowable reflux flow rate. The signal representative of the lower reflux flow rate is passed from said relay to a means of manipulating the reflux flow rate. Said concentration controller also transmits its signal representative of said required reflux flow rate to a maximizing controller having a set point representative of the maximum allowable reflux flow rate. Said maximizing controller compares the input signal with the set point and transmits a signal as the set point to a third controller, said third controller manipulating the reboiler heat input rate. The result of the dual control action of our novel system is to correct as much of a deviation from desired value in overhead product composition as possible by manipulation of reflux flow rate up to its maximum allowable value, then further manipulating reboiler heat input rate to correct the remaining composition deviation.

As in the case of the thermal cracking furnace, where the tube skin temperature is caused to maintain its maximum value by manipulation of feed rate so as to utilize full capacity of the process while achieving a complex criterion of performance, so also does the fractionation example of our control system bring about full capacity operation to satisfy the demands of a criterion of performance by manipulation of two process-related variables, one of which is subject to a limitation in magnitude.

As applied to other processes possessing similar chemical-physical-mathematical relations, the criterion of performance may range from a single measured value (such as flow rate, composition, etc.) to a complex quantity (conversion, efficiency, recovery, yield, profitability, etc.) which can be derived only by mathematical combination of at least several individually measured process variables. Similarly, the limited range process variable (such as temperature, pressure, flow rate, etc.) possesses its limitations because of safety, process-operability or other technico-economic considerations.

The inventive method of control thus provides a method of manipulating at least two manipulatable process variables in response to a measured process variable and of further adjusting one of said manipulatable process variables responsive to the allowable operating range or limit of the other of said manipulatable process variables.

As will be evident to those skilled in the art, various modifications of this invention can be made or followed in the light of the foregoing disclosure and discussion without departing from the spirit or scope thereof.

What is claimed is:

1. A method of controlling a thermal conversion process which comprises measuring at least a first process variable representative of the operation of said process, passing a first signal representative of said measurement to a first control zone and a second control zone, passing a second signal representative of the operating limit of a second input process variable to said first and second control zones, said first control zone capable of transmitting a third signal representative of the difference between said first and second signals received by said first control zone, said second control zone capable of transmitting a fourth signal representative of one of two signals selected from the group consisting of said first and said second signals received by said second control zone, passing said third signal from said first control zone to a means of manipulating a third input process variable responsive to said third signal, and passing said fourth signal from said second control zone to a means of manipulating said second input process variable responsive to said fourth signal.

2. In a process for the thermal cracking of light hydrocarbons which comprises: passing a light hydrocarbon feed stream to a thermal cracking zone, said light hydrocarbon selected from the group comprising ethane, propane, and n-butane, passing steam to said thermal cracking zone, and therein contacting said light hydrocarbon feed with said steam and withdrawing from said thermal cracking zone an effluent hydrocarbon stream; a method of control which comprises measuring a property of said light hydrocarbon feed stream which is representative of the chemical composition thereof, forming and passing a first signal representative of said measurement to a computing zone, measuring a property of said effluent stream which is representative of the chemical composition thereof, forming and passing a second signal representative of said effluent stream measurement to said computing zone, determining the percent conversion of said light hydrocarbon feed in said computing zone, forming and passing a third signal representative of said percent conversion of said light hydrocarbon feed stream from said computing zone to a first control zone and a second control zone, forming and passing a fourth signal representative of a maximum allowable temperature in said thermal cracking zone to said first and second control zones, said first control zone capable of forming and transmitting a fifth signal representative of the difference between said third and fourth signals received by said first control zone, said second control zone capable of forming and transmitting a sixth signal representative of the minimum of two signals selected from the group consisting of said third and said fourth signals received by said second control zone, passing said fifth signal from said first control zone to a means of manipulating the rate of flow of said light hydrocarbon feed to said thermal cracking zone responsive to said fifth signal, and passing said sixth signal from said second control zone to a means of manipulating the rate of flow of heating medium to said thermal cracking zone responsive to said sixth signal.

3. In a thermal cracking process which comprises passing a light hydrocarbon feed stream to a thermal cracking furnace, passing steam to said thermal cracking furnace and therein contacting said light hydrocarbon feed stream with said steam, and withdrawing from said thermal cracking furnace an effluent stream; a control system comprising means of measuring a property of said light hydrocarbon feed stream which is representative of the chemical composition thereof, a computing means, means for forming and passing a first signal representative of said measurement to said computing means, means of measuring a property of said effluent stream which is representative of the chemical composition thereof, means for forming and for transmitting a second signal representative of said effluent stream composition to said computing means, said computing means capable of determining the percent conversion of said light hydrocarbon feed, a first control means, a second control means, means for forming and for transmitting a third signal representative of said percent conversion of said light hydrocarbon feed stream from said computing means to said first control means and said second control means, means for forming and for transmitting a fourth signal representative of a maximum allowable thermal cracking temperature to said first and second control means, said first control means capable of forming and transmitting a fifth signal representative of the difference between said third and said fourth signals received by said first control means, said second control means capable of forming and transmitting a sixth signal representative of the minimum of said third and said fourth signals received by said second control means, means of manipulating the rate of flow of said light hydrocarbon feed stream to said thermal cracking furnace, means of transmitting said fifth signal from said first control means to said means of manipulating the rate of flow of said light hydrocarbon feed stream to said thermal cracking furnace responsive to said fifth signal, means of manipulating the rate of flow of heating medium to said thermal cracking furnace, and means of transmititng said sixth signal from said second control means to said means of manipulating the rate of flow of heating medium to said thermal cracking furnace responsive to said sixth signal.

4. A method of controlling a distillaiton process which comprises measuring at least a first process variable representative of the operation of said process, passing a first signal representative of said measurement to a first control zone and a second control zone, passing a second signal representative of the operating limit of a second input process variable to said first and second control zones, said first control zone capable of transmitting a third signal representative of the difference between said first and second signals received by said first control zone, said second control zone capable of transmitting a fourth signal representative of one of two signals selected from the group consisting of said first and said second signals received by said second control zone, passing said third signal from said first control zone to a means of manipulating a third input process variable responsive to said third signal, and passing said fourth signal from said second control zone to a means of manipulating said second input process variable responsive to said fourth signal.

5. In a process for the thermal cracking of light hydrocarbons which comprises passing a light hydrocarbon feed stream to a thermal cracking zone, said light hydrocarbon selected from the group comprising ethane, propane, and n-butane, passing steam to said thermal cracking zone, and therein contacting said light hydrocarbon feed with said steam and withdrawing from said thermal cracking zone an effluent hydrocarbon stream; a method of control which comprises measuring a property of said light hydrocarbon feed stream which is representative of the chemical composition thereof, forming and passing a first signal representative of said measurement to a computing zone, measuring a property of said effluent stream which is representative of the chemical composition thereof, forming and passing a second signal representative of said effluent stream measurement to said computing zone, determining the percent conversion of said light hydrocarbon feed in said computing zone, forming and passing a third signal representative of said percent conversion of said light hydrocarbon feed stream from said computing zone to a primary control zone, forming in and passing from said primary control zone a signal representative of a temperature, desired in said thermal cracking zone, capable of producing a desired conversion in said thermal cracking zone, to a first control zone and a second control zone, forming and passing a fourth signal representative of a maximum allowable temperature in said thermal cracking zone to said first and second control zones, said first control zone capable of forming and transmitting a fifth signal representative of the difference between said third and fourth signals received by said first control zone, said second control zone capable of forming and transmitting a sixth signal representative of the minimum of two signals selected from the group consisting of said third and said fourth signals received by said second control zone, passing said fifth signal from said first control zone to a means of manipulating the rate of flow of said light hydrocarbon feed to said thermal cracking zone responsive to said fifth signal, and passing said sixth signal from said second control zone to a means of manipulating the rate of flow of heating medium to said thermal cracking zone responsive to said sixth signal.

6. An apparatus for the thermal cracking of a light hydrocarbon which comprises in combination: a means for thermal cracking of a hydrocarbon, means for passing a light hydrocarbon feed stream to said means for thermal cracking, means for passing steam to said means for thermal cracking and therein contacting said light hydrocarbon feed with said steam, means for withdrawing from said means for thermal cracking an effluent hydrocarbon stream, a control means which comprises means for measuring a property of said light hydrocarbon feed stream which is representative of the chemical composition thereof, means for forming and passing a first signal representative of said measurement to a computing means, means for measuring a property of said effluent stream which is representative of the chemical composition thereof, means for forming and passing a second signal representative of said effluent stream measurement to said computing means, a primary control means, means for passing from said computer means a third signal representative of said percent conversion of said light hydrocarbon feed stream to said primary control means, means for forming in and passing from said primary control means a signal representative of a temperature desired in said thermal cracking means capable of producing a desired conversion in said thermal cracking means, a first control means, a second control means, means for passing said third signal to said first control means and to said second control means, means for passing a fourth signal representative of a maximum allowable temperature in said thermal cracking means to each of said first and said second control means, said first control means comprising means capable of forming and transmitting a fifth signal representative of the difference between said third and fourth signals received by said first control means, said second control means comprising means capable of forming and transmitting a sixth signal representative of the minimum of two signals selected from said third and said fourth signals received by said second control means, means for passing said fifth signal from said first control means to a means for manipulating the rate of flow of said light hydrocarbon feed to said thermal cracking means responsive to said fifth signal and means for passing said sixth signal from said second control means to a means for manipulating responsive to said sixth signal the rate of flow of heating medium to said thermal cracking means.

References Cited by the Examiner

UNITED STATES PATENTS

| 2,217,634 | 10/1940 | Rude | 208—106 |
| 2,337,851 | 12/1943 | Junkins | 196—132 |
| 2,586,503 | 2/1952 | Barnard | 196—132 |
| 2,618,668 | 11/1952 | O'Connor et al. | 260—683 |
| 2,664,245 | 12/1953 | O'Connor et al. | 196—132 |
| 2,684,326 | 7/1954 | Boyd | 196—132 |
| 2,860,174 | 11/1958 | Begley et al. | 260—683 X |
| 2,985,695 | 5/1961 | Platz et al. | 260—683 X |
| 2,994,646 | 8/1961 | Kleiss | 196—132 |

FOREIGN PATENTS 609,886 12/1960 Canada.

OTHER REFERENCES

Amber et al., Automatic Control, vols. 7–8, pp. 43–48, May 1958.

Andrews et al., Industrial and Engineering Chemistry, vol. 51, No. 2, pp. 125 to 128.

ALPHONSO D. SULLIVAN, *Primary Examiner.*

C. E. SPRESSER, *Assistant Examiner.*